United States Patent [19]

Weidman et al.

[11] Patent Number: 5,106,910
[45] Date of Patent: Apr. 21, 1992

[54] HIGH CONCENTRATION ACID RESISTANT COATINGS

[75] Inventors: Larry G. Weidman, Fort Myers; Alma L. Coats, Delray Beach, both of Fla.

[73] Assignee: Applied Polymer Systems, Tampa, Fla.

[21] Appl. No.: 433,767

[22] Filed: Nov. 9, 1989

[51] Int. Cl.⁵ .................. C08L 77/00; C08L 27/16
[52] U.S. Cl. .................................. 525/178; 525/432
[58] Field of Search .......................... 525/178, 151

[56] References Cited

U.S. PATENT DOCUMENTS 3,826,774  7/1974  Demillecamps et al. .......... 525/178

FOREIGN PATENT DOCUMENTS 0141462  9/1982  Japan ................................ 525/178
0064813  4/1985  Japan ................................ 525/178
3145353  6/1988  Japan ................................ 525/178

*Primary Examiner*—Ana L. Carrillo

[57] ABSTRACT

Improved polyamide-based compositions are provided which are particularly formulated for plasma-spray application to surfaces subjected to acidic conditions. The compositions include respective amounts of polyvinylidene fluoride, a polyamide (e.g., Nylon 11) and a compatable adhesive such as nylon terpolymer adhesive.

8 Claims, No Drawings

HIGH CONCENTRATION ACID RESISTANT COATINGS

BACKGROUND OF THE INVENTION

1. Field of the Invention

The present invention is broadly concerned with an improved coating adapted for application to a variety of metallic or other surfaces exposed to acidic conditions. More particularly, it is concerned with such compositions which preferably contain respective amounts of polyvinylidene fluoride, polyamide (nylon) and a compatable adhesive, and are suited for application via a high temperature plasma gun.

2. Description of the Prior Art

Many attempts have been made in the past to devise coatings having a high degree of acid resistance. These prior coatings have met with varying degrees of success, depending upon the type of surface to be coated, as well as the temperature and acid conditions being encountered.

Pending application for U.S. Letters Pat., Ser. No. 07/193,739, filed May 13, 1988 and entitled "Apparatus For Applying Plasma Flame Sprayed Polymers" describes in novel plasma spray gun which has been found to be particularly useful for the application of various coatings. The utility of this plasma spray device would be further enhanced by provision of a meltable composition which could be readily plasma spray-applied and yield a coating having excellent acid resistance.

SUMMARY OF THE INVENTION

The present invention provides a particulate composition which, upon melting and application thereof to a surface, greatly increases the acid resistance properties of the surface.

Broadly speaking, the compositions of the invention includes respective amounts of polyvinylidene fluoride, a polyamide, and a compatible adhesive serving to adhere to overall composition to a surface to be protected. Preferably, the composition includes polyvinylidene fluoride, Nylon 11, and a nylon terpolymer/caprolactam adhesive. The composition is in the form of a very fine powder, with the average particle size of the composition being less than about 50 microns.

The compositions of the invention are adapted to be melted and applied to a surface where the composition hardens and cools on the surface. It is preferred that the compositions hereof be applied by means of a high temperature plasma gun. In such an apparatus the compositions are injected into a high velocity stream of gas such as pure argon which has been converted by arc heating to the plasma state, and spraying the melted composition directly onto a surface to be coated. In practice, use is preferably made of the arc spraying device described in application for U.S. Letters Pat. Ser. No. 07/193,739 filed May 13, 1988 and entitled "Apparatus For Applying Plasma Flame Sprayed Polymers"; such application is incorporated by reference herein.

DESCRIPTION OF THE PREFERRED EMBODIMENTS

The preferred compositions in accordance with the present invention include respective quantities of polyvinylidene fluoride, polyamide and adhesive. The polyvinylidene fluoride component can be selected from any one of a number of commercially available materials, but preferably the "FORAFLON" polyvinylidene fluoride commercialized by Atochem, Inc. of Glen Rock, NJ is preferred. Such polyvinylidene fluoride is described in a four page trade brochure distributed by that company and entitled "FORAFLON Polyvinylidene Fluoride"; such brochure is incorporated by reference herein. Foraflon polyvinylidene fluoride is a pure semi-crystalline homopolymer containing about 59% fluorine by weight, that is free of additives, stabilizers and plasticizers. It exhibits excellent resistance to chemicals, including bromine, ageing due to a total inertness to ultra violet radiation, nd exhibits thermal stability without browning at service and processing temperatures. Recommended applications for Foraflon include acid bath heat exchangers, tanks and evaporators for bromine, and storage tanks for hydrofluoric acid. The polyvinylidene fluoride component is advantageously present in an amount up to about 75 percent by weight of the overall composition, and more preferably at a level 25 to 75 percent by weight.

The polyamide component may be selected upon the intended use of the composition and the acidic conditions to be experienced. Generally speaking, however, the polyamide fraction should be selected from the group consisting of Nylon 6/6, 6/10, 6/12, 10, 11, 12 and mixtures thereof. The polyamide should be present at a level of at least about 20 percent by weight, and more preferably at a level of about 20 to 65 percent by weight.

The adhesive fraction can be selected from a wide variety of candidates, again depending upon the ultimate end use of the composition in question. The function of the adhesive is to ensure adequate bonding of the polyamide polyvinylidene fluoride matrix to the surface to be protected. In practice, nylon terpolymer adhesives are employed, and particularly a nylon terpolymer/caprolactam adhesive sold under the designation "M548" by Atochem, Inc. of Bridsboro, Pennsylvania. This adhesive is described in a five-page Atochem MSDS brochure, such being incorporated by reference herein. M548 is a white powder consisting of greater than 95% nylon terpolymer 6/6.6/12; less than 4% caprolactam, and less than 1% additives. The adhesive should be present at a level of at least about 4 percent by weight, and generally ranges from about 4 to 12 percent by weight.

In formulation procedures, the respective components (all of which are in powder form) are simply mixed together to achieve an even dispersion. Preferably, the average particle size of the powdered components of the composition is less than about 50 microns.

Preferred techniques for applying the coating compositions of the present invention include the steps of providing a high velocity flow (i.e., about Mach I or above) of a gas such as pure argon; passing the gas transversely through an elongated high wattage electric arc for heating the gas and converting a portion thereof to the plasma state; injecting the powdered coating composition into the gas downstream from the arc for melting the powder without overheating the powder; directing the flow of the composition and associated gas into substantially one direction for minimizing overspray and misting of the composition; and spraying said melted composition onto a surface to be coated. More preferably, the powdered composition is injected into the gas stream in a downstream direction and at an angle of from about 12° to 20° to the direction of flow of the stream; and most preferably the powdered composition is injected in a downstream direction and at an angle of about 18° to that of the direction of travel of the gas stream so as to minimize vortex formation within the stream and minimize the over spray associated with vortex formation. Also more preferably, the powder is injected at a distance of from about 6 to 10 inches downstream from the arc (the arc being defined as a point of energy transfer between an anode and a cathode) so as to minimize overheating of the composition and so as to ensure that the composition reaches maximum velocity for a corresponding maximum bond strength with the surface to be coated; and more preferably, injecting the composition into the gas stream at a location of from about 5 to 8 inches downstream from the arc so as to achieve the proper molten state of the composition and a particle velocity favoring fusion bonding of the composition with the surface to be coated.

If injection of the powdered composition is made either through a high wattage arc or closely adjacent thereto, the composition will be overheated and rendered useless. If a lower wattage arc is employed so as to generate a temperature low enough to permit injection of the powder either through the arc or adjacent thereto, then the application rate permitted by the arc will be so low as to make large scale application economically infeasible. Thus, injection of the powdered composition substantially downstream from the arc is advantageous to achieve an economically feasible, high volumetric rate application technique. Also, injection of the powder downstream from the arc permits increased arc temperature, which in turn permits adequate heating of increased flows of gas thereby permitting adequate melting and particle velocity for increased powder flow rates.

The arc used in the method of the present invention has a preferred power level of 20 to 40 kilowatts and an associated gas temperature at the arc of approximately 12,000° to 30,000° F. The gas is then cooled so that by the time the gas has reached the inlet for the powdered composition, the temperature of the gas has dropped down to approximately 250° to 800° F. while travelling at a speed of 5,000 to 7,000 feet per second. Gases useful in this invention include $N_2$, $H_2$, He, Ar and combinations thereof. The coatings made from the composition of the present invention when applied using the application techniques of the present invention provide coatings having application rates, densities and bond strengths substantially greater than that of coatings applied by conventional polyamide application techniques such as fluidized bed dipping, acetylene flame spraying and electrostatic spraying.

The plasma spray method of the present invention further involves vacuuming toxic fumes from a periphery of the stream adjacent the surface to be sprayed for minimizing the escape of toxic fumes generated during heating of the composition, into the atmosphere. Vacuumed gases are oil filtered to remove the toxic gas fumes and organic acid vapors. The vacuum preferably pulls at a rate of at least 10 inches of water at 85 and preferably 360 cubic feet per minutes.

In specific application procedures, the described plasma gun is operated at about 520-540 amps, with the argon plasma gas being at a pressure of about 70 psi; argon is also used as a carrier gas, at a pressure of about 5-8 psi.

Two formulations in accordance with the invention giving excellent acid resistance and resistance to degradation against boiling water attack include: (I) 45% Foraflon; 45% Nylon 11; 10% M548 adhesive; (II) 70% Foraflon; 22% Nylon 11; 8% M548 adhesive. These formulations were plasma sprayed-applied to test coupons and subjected to an acid bath consisting of 30% sulfuric acid, 4% hydrofluoric acid and 66% water. The coated coupons showed excellent acid resistance. Formulation (I) above was also tested by placing coated coupons in boiling water; no changes in appearance or thickness of the coating was observed over a seven day period.

We claim:

1. A coating composition containing at least three ingredients adapted to be applied to a surface subjected to acidic conditions, said composition comprising:

an amount, up to about 75 percent by weight, of polyvinylidene fluoride;

at least about 20 percent by weight of a synthetic resin polyamide; and at least about 4 percent by weight of a compatible adhesive, different than said polyamide, said adhesive being operable for adequately adhering the overall composition to the surface, said polyvinylidene fluoride, polyamide and adhesive being present in amounts for creating an acid resistive coating on said surface, upon melting thereof and application to the surface, said composition being in the form of a dry powder adapted to be melted and applied to said surface.

2. The composition of claim 1, said polyvinylidene fluoride being present at a level of from about 25 to 75 percent by weight.

3. The composition of claim 1, said polyamide being present at a level of from about 20 to 65 percent by weight.

4. The composition of claim 1, said polyamide being selected from the group consisting of Nylon 6/6, 6/10, 6/12, 10, 11, 12 and mixtures thereof.

5. The composition of claim 1, said adhesive being present at a level of from about 4-12 percent by weight.

6. The composition of claim 1, said polyamide being Nylon 11.

7. The composition of claim 1, said adhesive being a nylon terpolymer/caprolactam adhesive.

8. The composition of claim 1, the average particle size of said powder being less than about 50 microns.

* * * * *